(12) United States Patent
Beuterbaugh et al.

(10) Patent No.: US 9,809,716 B2
(45) Date of Patent: Nov. 7, 2017

(54) METHODS AND SYSTEMS FOR PROTECTING ACID-REACTIVE SUBSTANCES

(71) Applicant: Halliburton Energy Services, Inc., Houston, TX (US)

(72) Inventors: Aaron Michael Beuterbaugh, Spring, TX (US); Enrique Antonio Reyes, Tomball, TX (US); Alyssa Lynn LaBlanc, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/889,150

(22) PCT Filed: Jan. 14, 2015

(86) PCT No.: PCT/US2015/011326
§ 371 (c)(1),
(2) Date: Nov. 5, 2015

(87) PCT Pub. No.: WO2016/114770
PCT Pub. Date: Jul. 21, 2016

(65) Prior Publication Data
US 2016/0340516 A1    Nov. 24, 2016

(51) Int. Cl.
*C09D 5/08*    (2006.01)
*C09K 8/03*    (2006.01)
(Continued)

(52) U.S. Cl.
CPC ............... *C09D 5/086* (2013.01); *C09K 8/03* (2013.01); *C09K 8/54* (2013.01); *C09K 8/74* (2013.01); *E21B 43/25* (2013.01)

(58) Field of Classification Search
CPC ........... C09K 13/06; C09K 13/12; C09K 8/92
(Continued)

(56) References Cited

U.S. PATENT DOCUMENTS

| 4,267,887 A | 5/1981 | Watanabe |
| 4,702,849 A | 10/1987 | Penny |

(Continued)

FOREIGN PATENT DOCUMENTS

WO    2014164835 A1    10/2014

OTHER PUBLICATIONS

Buijse et al., Organic Acids in Carbonate Acidizing, Society of Petroleum Engineers Inc., SPE 82211, 2003.
(Continued)

*Primary Examiner* — Doug Hutton, Jr.
*Assistant Examiner* — Ashish Varma
(74) *Attorney, Agent, or Firm* — McDermott Will & Emery LLP

(57) ABSTRACT

Inadvertent or unavoidable contact of an acid with an acid-reactive substance may preclude the acid's use in another location where its reactivity is more desired. Excessive reactivity of acids toward acid-reactive substances may lead to undesired effects such as surface erosion, matrix deconsolidation, scaling, and the like. Methods for protecting an acid-reactive surface from excessive reaction may comprise: depositing a protective coating comprising an N-(phosphonoalkyl)iminodiacetic acid or any salt thereof onto an acid-reactive surface; and contacting a mineral acid or an organic acid with the protective coating without substantially reacting the acid-reactive surface.

24 Claims, 1 Drawing Sheet

(51) Int. Cl.
*C09K 8/74* (2006.01)
*C09K 8/54* (2006.01)
*E21B 43/25* (2006.01)

(58) Field of Classification Search
USPC .......................................................... 166/300
See application file for complete search history.

(56) References Cited

U.S. PATENT DOCUMENTS

| | | | | |
|---|---|---|---|---|
| 4,747,975 | A | * | 5/1988 | Ritter ........................ C02F 5/08 |
| | | | | 134/3 |
| 5,171,460 | A | | 12/1992 | Underdown |
| 5,529,125 | A | | 6/1996 | Di Lullo Arias et al. |
| 7,166,560 | B2 | * | 1/2007 | Still .......................... C09K 8/03 |
| | | | | 166/308.1 |
| 7,265,079 | B2 | | 9/2007 | Willberg et al. |
| 7,935,660 | B2 | | 5/2011 | Harris et al. |

OTHER PUBLICATIONS

Huang et al., Carbonate Matrix Acidizing Fluids at High Temperatures: Acetic Acid, Chelating Agents or Long-Chained Carboxylic Acids? Society of Petroleum Engineers Inc. SPE 82268, 2003.
Jones et al., An Engineered Approach to Matrix Acidizing HTHP Sour Carbonate Reservoirs, Society of Petroleum Engineers Inc., SPE 68915, 2001.
International Search Report and Written Opinion for PCT/US2015/011326 dated Oct. 5, 2015.

* cited by examiner

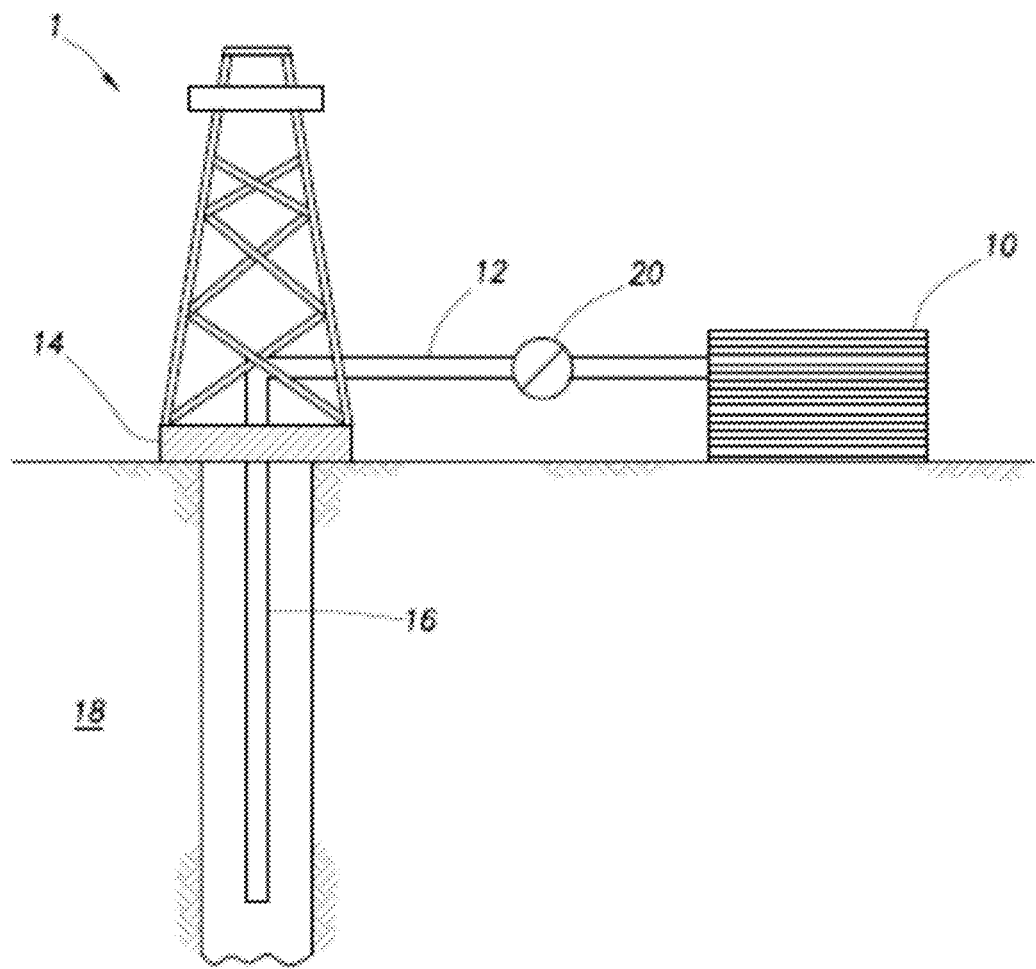

METHODS AND SYSTEMS FOR PROTECTING ACID-REACTIVE SUBSTANCES

CROSS-REFERENCE TO RELATED APPLICATIONS

This application is a 35 U.S.C. §371 national stage application of International Patent Application PCT/US2015/011326.

BACKGROUND

The present disclosure generally relates to acid-promoted processes, and, more specifically, to methods for protecting acid-reactive surfaces, particularly during subterranean treatment operations in which acids are used.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Acidic treatment fluids are frequently used in the course of conducting various subterranean treatment operations. Illustrative uses of acidic treatment fluids during subterranean treatment operations include, for example, matrix acidizing of siliceous and/or non-siliceous formations, scale dissolution and removal operations, gel breaking, acid fracturing, and the like. When acidizing a non-siliceous material, such as a carbonate material, mineral acids such as hydrochloric acid may often be sufficient to affect dissolution. Organic acids such as formic acid or acetic acid may be used in a similar manner to hydrochloric acid when dissolving a non-siliceous material. Siliceous materials, in contrast, are only readily dissolvable using hydrofluoric acid, optionally in combination with other mineral acids or organic acids. Similar considerations apply when dissolving scale.

During an acidizing or scale removal operation, an acid-reactive substance in the subterranean formation or wellbore can be dissolved by one or more acids to expand existing flow pathways in the subterranean formation, to create new flow pathways in the subterranean formation, and/or to remove acid-reactive precipitation damage present in the wellbore or subterranean formation. The acid-reactive material can be part of the native formation matrix, formed in the course of operating the wellbore (e.g., scale), or have been deliberately introduced into the wellbore (e.g., proppant or gravel particulates). In carbonate formations, for example, a carbonate mineral in the native formation matrix may be acidized in order to stimulate production.

Although carbonate minerals can be readily acidized with both mineral acids and organic acids, the acid's reactivity with carbonate minerals is often excessive and may lead to various undesirable effects. For example, excessively rapid reaction of a carbonate mineral with an acid can lead to bulk erosion, rather than the desired wormhole formation or the creation of other conductive channels in the formation matrix in order to increase its permeability. As used herein, the term "wormhole" refers to a channel generated in the matrix of a subterranean formation that positively contributes to increased incremental permeability. Scaling may also become problematic when a carbonate mineral is inadvertently reacted with an acid. The reaction of mineral and organic acids with soft and friable matrices, particularly at elevated formation temperatures, can often occur too rapidly and can lead to undesirable matrix deconsolidation. Finally, when using an acid to break a gel or to remove an acid-degradable filter cake within a wellbore, reactivity issues of the formation matrix may need to be taken into account in choosing an appropriate treatment protocol.

Another problem associated with the rapid reaction of carbonate minerals and other acid-reactive substances is that the excessive acid reactivity can preclude the placement of the acid in a location where its reactivity is more desired. For example, rapid spending of an acid in the near-wellbore region of a carbonate formation can preclude deeper penetration of the acid into the formation matrix to better promote stimulation. In order to achieve deeper acid penetration into the formation matrix, greater quantities of the acid may need to be used, which may be undesirable due to cost, safety, time and environmental considerations. Acid-promoted damage to the near-wellbore region can also occur, which may necessitate further damage control and remediation operations, thereby adding further cost and time delays. Costly diverting strategies and/or alternative treatment protocols not relying upon strong acids may be needed to avoid excessively reacting a carbonate mineral with an acid in the near-wellbore region. Relative permeability modifiers (RPMs) are one alternative technique whereby chemical diversion of an aqueous fluid may be achieved.

BRIEF DESCRIPTION OF THE DRAWING

The following FIGURE is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location, according to one or more embodiments.

DETAILED DESCRIPTION

The present disclosure generally relates to acid-promoted processes, and, more specifically, to methods for protecting acid-reactive surfaces, particularly during subterranean treatment operations in which acids are used.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, excessive reactivity of some acid-reactive substances, particularly those containing an acid-reactive surface, can preclude contacting an acid with the surface for any significant length of time. Such excessive reactivity can be particularly problematic in subterranean treatment operations, where there may be issues of wellbore damage, ineffective stimulation, and combinations thereof. In addition, the high reactivity of acids with some acid-reactive surfaces can preclude delivery of the acid to a wellbore location where the acid's presence is more desired. For example, when highly permeable particulate packs or screens are present, it may be difficult to properly place an acid due to its premature reaction with an acid-reactive material. Highly permeable thief zones may also preclude placement of an acid into a desired location within a wellbore.

While investigating the potential use of N-(phosphonoalkyl)iminodiacetic acids to promote disintegrative removal of various acid-reactive substances in the presence of an organic acid or a mineral acid, the present inventors surprisingly discovered that such compounds are instead protective of the acid-reactive substance. An illustrative example of an N-(phosphonoalkyl)iminodiacetic acid that can be used for this purpose is N-(phosphonomethyl)iminodiacetic acid (PMIDA). Illustrative acid-reactive substances that may be protected by PMIDA and other N-(phosphonoalkyl)iminodiacetic acids include, for example, metals, acid-reactive or acid-soluble metal salts, carbonate minerals, and acid-degradable polymers. Ordinarily, one would expect PMIDA and other N-(phosphonoalkyl)iminodiacetic acids to promote dissolution of metals (particularly non-alloyed metals), metal salts, and metal-containing minerals through complexation of a metal ion. Instead, the inventors discovered that an opposite protective effect occurs. As used herein, the terms "complex," "complexing," "complexation" and other grammatical variants thereof will refer to the formation of a metal-ligand bond, such as through formation of a chelate.

The inventors believe that N-(phosphonoalkyl)iminodiacetic acids may suppress the reactivity of acid-reactive substances containing an acid-reactive surface by forming a protective coating on the surface. The protective coating may then suppress further reaction of a mineral acid or an organic acid with the acid-reactive surface. Depending on the type of acid-reactive surface being protected and the deposition pH, the protective coating may be formed by several non-limiting and possibly simultaneous mechanisms, which are discussed further below.

At low pH values, all of the carboxylic acid and phosphonic acid groups in PMIDA and other N-(phosphonoalkyl)iminodiacetic acids may be protonated and incapable or only weakly capable of complexing a metal ion. In PMIDA, for example, the two most acidic functional groups have pKa values of approximately 2.00 and 2.25, and below a pH value of about 2, these groups are protonated and incapable of participating in metal ion complexation. In addition, at these and other low pH values, PMIDA and other N-(phosphonoalkyl)iminodiacetic acids are relatively insoluble in aqueous fluids and may be deposited on various types of surfaces, including the acid-reactive surfaces noted above, thereby forming a protective coating. Deposition may occur from a suspension of the PMIDA or other N-(phosphonoalkyl)iminodiacetic acid. While the pH remains low, the protective coating may remain intact and limit access of the acid to the acid-reactive surface, thereby suppressing the acid's reactivity toward the surface. This mechanism may be particularly operative when no metal ions are present that might undergo complexation upon a pH rise, such as when an acid-degradable polymer is being protected, for example.

Even after becoming at least partially deprotonated and regaining activity for metal ion complexation to take place, PMIDA and other N-(phosphonoalkyl)iminodiacetic acids form metal complexes that remain relatively insoluble in low pH fluids. Accordingly, in the case of acid-reactive substances comprising metals or metal salts (e.g., a metal-containing mineral), PMIDA and other N-(phosphonoalkyl) iminodiacetic acids may complex surface metal ions and undergo retention at the acid-reactive surface as an insoluble metal complex, thereby forming the protective coating. For example, PMIDA or another N-(phosphonoalkyl)iminodiacetic acid may react with a carbonate mineral (e.g., calcite) to produce a surface coating of an insoluble metal complex (e.g., Ca-PMIDA) that limits further reactivity of the carbonate mineral with an acid. The metal complex may be formed by directly interacting the surface with PMIDA or another N-(phosphonoalkyl)iminodiacetic acid at a pH where complexation occurs. In other cases, the PMIDA or other N-(phosphonoalkyl)iminodiacetic acid may first be deposited as a non-complexed protective coating on the acid-reactive surface, and complexation of the metal surface may then occur as the pH rises in the vicinity of the acid-reactive surface. A further pH rise may then remove the protective coating, as discussed further below. Thermodynamically driven saturation effects may impact the deposition and removal of the protective coating.

N-(phosphonoalkyl)iminodiacetic acids and their metal complexes are also advantageous as protective coatings in that they can be readily removed, if desired, once their acid-protective effects are no longer needed. Specifically, at mildly acidic to alkaline pH values (e.g., about 5 or above), the N-(phosphonoalkyl)iminodiacetic acid or a metal complex thereof can be released from the acid-reactive surface due to increased solubility. Although removal of the protective coating is optional, it may be desirable to remove the protective coating once an acid-reactive surface of lesser reactivity or higher effective permeability has been exposed to an acid. For example, as discussed below, the protective coatings of the present disclosure may allow chemical diversion of acids to take place, and once diversion is no longer needed, the acid reactivity of the coated surface may be simply restored as described above. This can allow stimulation, cleanout, breaking, or any combination thereof to take place at both locations in a wellbore without resorting to more complicated fluid diversion strategies. In addition, the protective coating may be self-cleaning when used in a subterranean formation in which alkaline brines are present. Further, as the PMIDA or other N-(phosphonoalkyl)iminodiacetic acid is released from the acid-reactive surface, it may be released in a salt form suitable for complexing metal ions elsewhere in the downhole environment. The released N-(phosphonoalkyl)iminodiacetic acid can promote dissolution of a carbonate matrix elsewhere in the wellbore through metal ion complexation, or stray metal ions may be complexed by the N-(phosphonoalkyl)iminodiacetic acid before they precipitate as highly impermeable scale.

As indicated previously, the protective coatings of the present disclosure can be advantageous in promoting chemical diversion of acids. By forming a protective coating on a first acid-reactive surface, an acid may bypass this surface without being reacted and then react with a second acid-reactive surface. The second acid-reactive surface may have a lower reactivity than does the first acid-reactive surface, and it may not be effectively reacted if the acid has previously reacted at the first acid-reactive surface. In other instances, the first and second acid-reactive surfaces may have comparable reactivity profiles, but the acid may spend before it even has a chance to reach the second acid-reactive surface. Chemical diversion of the acid by the protective coatings of the present disclosure may allow the second acid-reactive surface to be more effectively treated with the acid in either instance. For example, such chemical diversion may allow an acid-reactive substance in the near-wellbore area to be bypassed in deference to acidizing deeper within the subterranean formation, thereby allowing more effective stimulation to occur. In addition, by slowing an acid's reactivity in the near-wellbore area, wormhole generation may be promoted and there may be a decreased propensity toward near-wellbore damage.

PMIDA and other N-(phosphonoalkyl)iminodiacetic acids can also present a number of other advantages for use in protecting acid-reactive surfaces, particularly in a downhole environment. PMIDA is a relatively inexpensive material, thereby not adding an excessive cost burden to large scale operations. Moreover, PMIDA is believed to be environmentally benign, due at least in part to its propensity toward biodegradation. As used herein, the terms "biodegradation," "biodegradable" and related variants thereof will refer to a substance that can be broken down by exposure to environmental conditions including native or non-native microbes, sunlight, air, heat, and the like. No particular rate of biodegradation is implied by use of these terms unless otherwise specified herein. PMIDA advantageously possesses a sufficiently high chemical stability over the short term to suppress reactivity of an organic acid or a mineral acid, but a short enough biodegradation lifetime to make it environmentally friendly for use in most locales. Still further, PMIDA has good thermal stability, thereby allowing it to be used in high temperature subterranean formations, including those having a temperature above 300° F. Thus, PMIDA and N-(phosphonoalkyl)iminodiacetic acids can be used under thermal conditions where increased acid reactivity is sometimes problematic.

In various embodiments, methods described herein may comprise: depositing a protective coating comprising an N-(phosphonoalkyl)iminodiacetic acid or any salt thereof onto an acid-reactive surface; and contacting a mineral acid or an organic acid with the protective coating without substantially reacting the acid-reactive surface.

A wide variety of acid-reactive surfaces or substances may be protected by practicing the various embodiments of the present disclosure. In various embodiments, the acid-reactive surface may comprise a metal, a metal salt, a mineral (particularly a carbonate mineral), an acid-degradable polymer, or the like. In more particular embodiments, the acid-reactive surface may be present in a wellbore penetrating a subterranean formation during a subterranean treatment operation, such as acidizing operation, for example. In other embodiments, the acid-reactive surface may be present when degrading a gel or a filter cake with acid following a drilling operation, for example. The acid-reactive surface may be natively present in the wellbore or may have been deliberately placed during a subterranean treatment operation. In a wellbore, the acid-reactive surface may comprise, for example, a matrix comprising the subterranean formation, at least a portion of a particulate pack (e.g., a proppant pack or a gravel pack), or at least a portion of a metal tool that is present in the wellbore.

In some embodiments, the N-(phosphonoalkyl)iminodiacetic acid or any salt thereof may be present in a drilling fluid being used to drill a wellbore in an acid-degradable material, such as a carbonate mineral. Accordingly, in such embodiments, the N-(phosphonoalkyl)iminodiacetic acid or any salt thereof can provide a filter cake that arrests fluid loss during drilling in much the same manner as that described above. Thief zones may be addressed in this manner. In addition, the protective coating may leave the wellbore directly conditioned against reaction with an acid during subsequent acid-promoted treatment operations.

Illustrative carbonate minerals that may be protected from an organic acid or a mineral acid by practicing the various embodiments of the present disclosure include, for example, calcite (calcium carbonate), dolomite (calcium magnesium carbonate), siderite (iron carbonate) and any combination thereof. Calcite and dolomite may be particularly prevalent in carbonate formations. Optionally, other minerals may be admixed with calcite and/or dolomite in any combination. Other minerals that may be present in a calcite or dolomite surface being protected by the embodiments of the present disclosure include, for example, iron sulfide, iron carbonate, silicates and aluminosilicates.

The N-(phosphonoalkyl)iminodiacetic acid or any salt thereof may be deposited as a coating onto the acid-reactive surface before or while the acid-reactive surface is being contacted with the organic acid or the mineral acid. In some embodiments, the coating may be deposited first, and the organic acid or the mineral acid may be contacted with the coated surface thereafter. In other embodiments, the N-(phosphonoalkyl)iminodiacetic acid or any salt thereof and the acid may be contacted with the acid-reactive surface concurrently. Concurrent contact may occur from separate streams of the acid and the N-(phosphonoalkyl)iminodiacetic acid or any salt thereof, or these two components may be together in a combined fluid phase, such as a subterranean treatment fluid. When contacted concurrently with the acid-reactive surface, the N-(phosphonoalkyl)iminodiacetic acid or any salt thereof may be in insoluble form in a fluid from which it is deposited so as to promote formation of the protective coating. The N-(phosphonoalkyl)iminodiacetic acid may be fully protonated when in the insoluble form. Even when deposited concurrently in the presence of an acid, a protective coating formed from N-(phosphonoalkyl)iminodiacetic acid or any salt thereof can still be formed rapidly enough to mitigate erosion of the acid-reactive surface by the acid.

In some embodiments, the protective coating may be deposited from a treatment fluid comprising the N-(phosphonoalkyl)iminodiacetic acid or any salt thereof. In some embodiments, a mineral acid or an organic acid may be present in the treatment fluid in combination with the N-(phosphonoalkyl)iminodiacetic acid or any salt thereof. In a low pH aqueous fluid (e.g., a pH of about 3 or lower, particularly a pH of about 2 or lower), the N-(phosphonoalkyl)iminodiacetic acid or any salt thereof may be relatively insoluble, which may promote its deposition as a protective coating according to the disclosure herein. The solubility limit may be decreased at lower pH values, and the time required before precipitation occurs may vary depending upon the pH and the initial concentration. The pH may also be adjusted to promote metal ion complexation on the acid-reactive surface without promoting excessive dissolution of the metal complex in order to form a protective coating comprising the metal complex. Illustrative treatment fluids in which the N-(phosphonoalkyl)iminodiacetic acid or any salt thereof may be present include, for example, acidizing fluids, fracturing fluids, drilling fluids, breaker fluids, and the like.

The pH of the treatment fluid may be chosen such that the N-(phosphonoalkyl)iminodiacetic acid is initially fully protonated, or the pH may be chosen such that one or more of the acid groups of the N-(phosphonoalkyl)iminodiacetic acid is deprotonated. When fully protonated at low pH values, the N-(phosphonoalkyl)iminodiacetic acid may initially be insoluble in the treatment fluid. That is, the N-(phosphonoalkyl)iminodiacetic acid thereof may be suspended in the treatment fluid. A salt of the N-(phosphonoalkyl)iminodiacetic acid may similarly be suspended in the treatment fluids of the present disclosure. As indicated above, placing the N-(phosphonoalkyl)iminodiacetic acid or any salt thereof in suspended form in the treatment fluid may promote formation of a protective coating according to the embodiments of the present disclosure. When deposited from a suspension, the N-(phosphonoalkyl)iminodiacetic acid or any salt thereof may initially be incapable of promoting complexation of a metal ion. However, as the treatment fluid spends and the pH rises, the N-(phosphonoalkyl)iminodiacetic acid may become at least partially deprotonated and capable of complexing a metal ion. A protective coating comprising the metal complex may be formed as the pH rises. The N-(phosphonoalkyl)iminodiacetic acid or a complex thereof may also increase in solubility as the pH further increases. At pH values of about 5 or above, the protective coating comprising the N-(phosphonoalkyl)iminodiacetic acid or any salt thereof may be removed from the acid-reactive surface, as indicated above.

In some embodiments, the protective coating may be deposited at a pH of about 3 or lower, or about 2 or lower. In more particular embodiments, the protective coating may be deposited at a pH ranging between about 0 and about 2.5, or between about 0.5 and about 2.5, or between about 1 and about 2.5, or between about 1 and about 2, or between about 1.5 and about 2.5, or between about 1.5 and about 2, or between about 1.5 and about 2.5.

The treatment fluids of the present disclosure may comprise an aqueous fluid or an oleaginous carrier fluid as their continuous phase. Suitable aqueous carrier fluids may include, for example, fresh water, acidified water, salt water, seawater, brackish water, produced water, flowback water, brine (e.g., a saturated salt solution), or an aqueous salt solution (e.g., a non-saturated salt solution). Aqueous carrier fluids may be obtained from any suitable source.

In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the treatment fluid.

In other various embodiments, the carrier fluid of the treatment fluids may comprise an oleaginous carrier fluid. Suitable oleaginous carrier fluids may include, for example, an organic solvent, a hydrocarbon, oil, a refined component of oil, or any combination thereof.

Examples of organic and mineral acids that may be contacted with the acid-reactive surface according to the embodiments of the present disclosure include, for example, hydrochloric acid, hydrobromic acid, formic acid, acetic acid, chloroacetic acid, dichloroacetic acid, trichloroacetic acid, methanesulfonic acid, citric acid, maleic acid, glycolic acid, lactic acid, malic acid, oxalic acid, the like, and any combination thereof.

In some embodiments, the acid may be generated from an acid-generating compound. Examples of suitable acid-generating compounds may include, but are not limited to, esters, aliphatic polyesters, orthoesters, poly(orthoesters), poly(lactides), poly(glycolides), poly(ε-caprolactones), poly (hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

In some embodiments, the protective coating may be deposited from a gelled fluid comprising the N-(phosphonoalkyl)iminodiacetic acid or any salt thereof. Gelling a fluid in which the N-(phosphonoalkyl)iminodiacetic acid or any salt thereof is present may promote deposition of a protective coating on an acid-reactive surface. Suitable gelling agents capable of suspending the N-(phosphonoalkyl)iminodiacetic acid or any salt thereof in a fluid phase are not believed to be particularly limited. Illustrative examples of suitable gelling agents may include, but are not limited to, xanthans, diutans, scleroglucans, nanocellulose, cellulose, acrylamide polymers, co-polymers of AMPS and acrylamide, viscoelastic surfactants, modified polyesters and the like. Non-gelled fluids are also suitable for use in the embodiments of the present disclosure, provided that pumping rates are sufficiently high to maintain the N-(phosphonoalkyl)iminodiacetic acid or any salt thereof in a suspended form in the fluid phase.

In various embodiments, the neutral form of the N-(phosphonoalkyl)iminodiacetic acid used in forming the protective coatings of the present disclosure may have the structure shown in Formula 1

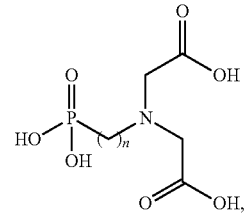

Formula 1 wherein n is an integer ranging between 1 and about 20. In some embodiments, a particularly suitable N-(phosphonoalkyl)iminodiacetic acid for practicing the disclosure herein can be N-(phosphonomethyl)iminodiacetic acid, in which n is 1. In more particular embodiments, n may range between 1 and about 5, or between about 5 and about 20, or between about 5 and about 15, or between about 10 and about 20. Longer chain lengths, such as between about 5 and about 20 carbons in length, may be desirable in order to lessen the solubility of the N-(phosphonoalkyl)iminodiacetic acid or any salt thereof in order to promote formation of a protective coating. Additional functionality may also be introduced to the N-(phosphonoalkyl)iminodiacetic acid in order to further tailor its solubility, pKa values, and/or biodegradation rate, for example.

As indicated above, in some embodiments, the protective coating on the acid-reactive surface may divert a mineral acid or an organic acid from a first location in the wellbore where the protective coating is deposited to a second location in the wellbore. The second location may be substantially lacking in the protective coating so that an acid-reactive surface or substance there may undergo reaction with the acid. In some embodiments, the first location in the wellbore may comprise the near-wellbore area, such as the walls of the wellbore, and the second location in the wellbore may comprise a portion of the subterranean formation radially offset from the walls of the wellbore (i.e., deeper in the subterranean formation). This can allow stimulation to occur within the subterranean formation in deference to spending of the acid in the near-wellbore area, possibly accompanied by subterranean formation damage. In other embodiments, the first location in the wellbore may comprise an interval that is nearer the upper terminus of the wellbore and the second location may comprise an interval that is more removed from the upper terminus of the wellbore, such as in bullheading operations. In still other embodiments, the first location in the wellbore may comprise an interval that is more removed from the upper terminus of the wellbore and the second location may comprise an interval that is nearer the upper terminus of the wellbore. In either case, the protective coating may allow an acid to be diverted from the first interval to the second interval in order to allow stimulation of the second interval to occur, for example. In still other embodiments, the first location in the wellbore may comprise an interval of the subterranean formation, and the second location may comprise an acid-reactive substance within the wellbore itself, such as an acid-degradable gel or an acid-degradable filter cake.

In some embodiments, the protective coating may allow fluid diversion to occur away from a thief zone in the subterranean formation. Thief zones can be laminated or completely removed at a distance from one another across the entire interval of interest. Protection against fluid loss into a thief zone can be particularly desirable during a drilling operation.

In further embodiments, the methods of the present disclosure may comprise reacting the mineral acid or the organic acid with an acid-reactive substance or surface at the second location. The acid-reactive substance or surface at the second location may comprise the same acid-reactive substance or surface present at the first location, or it may be different. Illustrative acid-reactive materials that may be reacted at the second location include, for example, the formation matrix, scale, an acid-degradable filter cake, or an acid-degradable polymer gel in the wellbore.

In still further embodiments, the methods of the present disclosure may comprise removing the protective coating from the acid-reactive surface. In various embodiments, removing the protective coating from the acid-reactive surface may comprise contacting the protective coating with an aqueous fluid having a pH of about 5 or greater. Below this pH value, particularly below a pH of about 3, the N-(phosphonoalkyl)iminodiacetic acid, any salt thereof, or any complex thereof may remain substantially insoluble, and the protective coating may remain intact. In some embodiments, the protective coating may be removed at mildly acidic pH values, such as a pH of about 5 to about 7, or about 5.5 to about 7, or about 6 to about 7. At these pH values, the acid's reactivity toward the acid-reactive surface may be considerably reduced over that of more concentrated acid solutions. In other embodiments, the protective coating may be removed at neutral to alkaline pH values, such as a pH value of about 7 to about 12, or about 7 to about 10, or about 7 to about 9.

Accordingly, in some embodiments, methods of the present disclosure may comprise: introducing a treatment fluid comprising an N-(phosphonoalkyl)iminodiacetic acid or any salt thereof into a wellbore penetrating a subterranean formation; depositing a protective coating comprising the N-(phosphonoalkyl)iminodiacetic acid or any salt thereof onto an acid-reactive surface in the wellbore; contacting a mineral acid or an organic acid with the protective coating without substantially reacting the acid-reactive surface; and diverting the mineral acid or the organic acid from a first location in the wellbore where the protective coating is deposited to a second location in the wellbore.

The chosen concentration of the N-(phosphonoalkyl)iminodiacetic acid or any salt thereof in the treatment fluid may vary over a wide range. In various embodiments, the concentration of the N-(phosphonoalkyl)iminodiacetic acid or any salt thereof in the treatment fluid may range between about 0.5 wt. % to about 55 wt. %. In more particular embodiments, the concentration may range between about 1 wt. % and about 25 wt. %. In still more particular embodiments, the concentration may range between about 1.5 wt. % and about 15 wt. %. Depending on the pH of the treatment fluid and the concentration, the N-(phosphonoalkyl)iminodiacetic acid or any salt thereof may be substantially soluble in the treatment fluid, or it may be at least partially suspended in the treatment fluid. When suspended, it may be possible to deposit the protective coating as a filter cake on an acid-reactive surface or substance when treating a subterranean formation. Treatment fluids comprising a solubilized N-(phosphonoalkyl)iminodiacetic acid or any salt thereof may be used to directly form a metal complex upon the acid-reactive surface.

In additional embodiments, the treatment fluids described herein may further comprise any number of additives that are commonly used in downhole operations including, for example, silica scale control additives, corrosion inhibitors, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. One of ordinary skill in the art will be able to formulate a treatment fluid having properties suitable for a given application.

In other various embodiments, systems configured for delivering a treatment fluid of the present disclosure to a downhole location are described herein. In various embodiments, the systems can comprise a pump fluidly coupled to a tubular, the tubular containing a treatment fluid comprising a suspension of an N-(phosphonoalkyl)iminodiacetic acid or any salt thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the N-(phosphonoalkyl)iminodiacetic acid or any salt thereof is formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for protecting an acid-reactive surface. The methods comprise: depositing a protective coating comprising an N-(phosphonoalkyl)iminodiacetic acid or any salt thereof onto an acid-reactive surface; and contacting a mineral acid or an organic acid with the protective coating without substantially reacting the acid-reactive surface.

B. Methods for protecting an acid-reactive surface in a wellbore. The methods comprise: introducing a treatment fluid comprising an N-(phosphonoalkyl)iminodiacetic acid or any salt thereof into a wellbore penetrating a subterranean formation; depositing a protective coating comprising the N-(phosphonoalkyl)iminodiacetic acid or any salt thereof onto an acid-reactive surface in the wellbore; contacting a mineral acid or an organic acid with the protective coating without substantially reacting the acid-reactive surface; and diverting the mineral acid or the organic acid from a first location in the wellbore where the protective coating is deposited to a second location in the wellbore.

C. Systems for introducing a treatment fluid into a wellbore. The systems comprise: a pump fluidly coupled to a tubular, the tubular containing a treatment fluid comprising a suspension of an N-(phosphonoalkyl)iminodiacetic acid or any salt thereof.

Each of embodiments A-C may have one or more of the following additional elements in any combination:

Element 1: wherein the protective coating is deposited onto the acid-reactive surface before the mineral acid or the organic acid is contacted with the acid-reactive surface.

Element 2: wherein the mineral acid or the organic acid comprises an acid selected from the group consisting of hydrochloric acid, hydrobromic acid, methanesulfonic acid, chloroacetic acid, dichloroacetic acid, trichloroacetic acid, formic acid, acetic acid, and any combination thereof.

Element 3: wherein the acid-reactive surface is present in a wellbore penetrating a subterranean formation.

Element 4: wherein the acid-reactive surface comprises a matrix comprising the subterranean formation, at least a portion of a particulate pack, or at least a portion of a metal tool that is present in the wellbore.

Element 5: wherein the matrix comprises a mineral selected from the group consisting of calcite, dolomite, and any combination thereof.

Element 6: wherein the protective coating diverts the mineral acid or the organic acid from a first location in the wellbore where the protective coating is deposited to a second location in the wellbore.

Element 7: wherein the protective coating is deposited from a gelled fluid comprising the N-(phosphonoalkyl) iminodiacetic acid or any salt thereof.

Element 8: wherein the protective coating is deposited from a fluid phase comprising a suspension of the N-(phosphonoalkyl)iminodiacetic acid or any salt thereof.

Element 9: wherein the method further comprises removing the protective coating from the acid-reactive surface by contacting the protective coating with an aqueous fluid having a pH of about 5 or greater.

Element 10: wherein the N-(phosphonoalkyl)iminodiacetic acid has a structure of

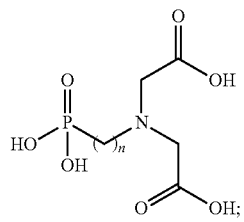

wherein n is an integer ranging between 1 and about 20.

Element 11: wherein the N-(phosphonoalkyl)iminodiacetic acid comprises N-(phosphonomethyl)iminodiacetic acid.

Element 12: wherein the method further comprises reacting the mineral acid or the organic acid with an acid-reactive substance at the second location.

Element 13: wherein the subterranean formation comprises a carbonate mineral.

Element 14: wherein the N-(phosphonoalkyl)iminodiacetic acid or any salt thereof is suspended in the treatment fluid.

Element 15: wherein the mineral acid or the organic acid is introduced into the wellbore after depositing the protective coating.

Element 16: wherein a concentration of the N-(phosphonoalkyl)iminodiacetic acid or any salt thereof in the treatment fluid ranges between about 1.5 wt. % and about 15 wt. %.

By way of non-limiting example, exemplary combinations applicable to A-C include:

The method of A in combination with elements 1 and 3.
The method of A in combination with elements 1, 3 and 4.
The method of A in combination with elements 3 and 6.
The method of A in combination with elements 3 and 9.
The method of A in combination with elements 3, 6 and 12.
The method of A in combination with elements 2 and 9.
The method of B in combination with elements 1 and 2.
The method of B in combination with elements 1 and 15.
The method of B in combination with elements 1 and 16.
The method of B in combination with elements 2 and 9.
The method of B in combination with elements 2 and 10.
The method of B in combination with elements 4 and 16.
The method of B in combination with elements 13 and 14.
The method of B in combination with elements 9 and 16.
The system of C in combination with elements 10 and 16.
The system of C in combination with elements 11 and 16.
The system of C in combination with elements 10 and 14.

To facilitate a better understanding of the embodiments of the present disclosure, the following examples of preferred or representative embodiments are given. In no way should the following examples be read to limit, or to define, the scope of the disclosure.

EXAMPLES

Example 1: Formation and Removal of a Protective Coating

A limestone core sample was obtained, and approximately one-third of the core surface was soaked in a 0.6 M PMIDA solution for one hour. The core was then removed from the PMIDA solution and dried. Thereafter, the core was subsequently positioned with the treated portion (one-third of the linear height) above the untreated portion (two-thirds of the linear height). A 15% hydrochloric acid solution was then drizzled down the entire length of the core. No reaction was observed in the upper (treated) portion of the core, whereas a vigorous reaction was observed in the lower (untreated) portion of the core, as evidenced by gas (carbon dioxide) evolution from carbonate anion decomposition. There was heavy etching in the untreated section of the core, whereas there was substantially no etching in the treated section.

After the initial acid exposure, the treated section of the core was exposed to a 5% $NaHCO_3$ solution for one minute. This action resulted in near-instantaneous removal of the protective coating, as evidenced by removal of a white solid and a subsequent reaction of the core with acid. Specifically, 15% hydrochloric acid was again drizzled along the entire length of the core, and in this instance, extensive reaction occurred along the entire length of the core, as evidenced by vigorous gas formation.

Example 2: Core Flow Test

A 2"×10" limestone core was longitudinally split into two hemispherical cylinders, one of which had a notch cut along its length to allow acid flow through a simulated fracture. The two core halves were then submerged in gelled solution of suspended PMIDA (0.6 M) for one hour. The gelling agent was xanthan in a concentration of 40 pounds per thousand gallons. The core halves were then removed from the PMIDA solution and dried. The dried core halves were then placed back together to create a cylinder, where the union between the two halves represents a simulated subterranean fracture. 10% hydrochloric acid (300 mL) was then flowed through the recombined core at a flow rate of 10 mL/min and at a temperature of 200° F. After the acid flow was completed, the core was disassembled and observed. There was minimal dissolution along the simulated fracture defined by the notch along the longitudinal length of the hemispherical cylinders. In contrast, uniform etching occurred along the untreated surfaces. Thus, the protective coating of PMIDA directed acid reactivity away from the main fracture and allowed fracture expansion to occur, rather than uncontrolled erosion of the fracture face.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:
1. A method comprising:
depositing a protective coating comprising an N-(phosphonoalkyl)iminodiacetic acid or any salt thereof onto an acid-reactive surface comprising an acid-reactive substance selected from the group consisting of a metal, a metal salt, a mineral, a carbonate mineral, and an acid-degradable polymer; and
contacting a mineral acid or an organic acid with the protective coating without substantially reacting the acid-reactive surface where the protective coating is present for a time period when the pH of the mineral acid or organic acid in contact with the protective coating is about 3 or lower.
2. The method of claim 1, wherein the protective coating is deposited onto the acid-reactive surface before the mineral acid or the organic acid is contacted with the acid-reactive surface.
3. The method of claim 1, wherein the mineral acid or the organic acid comprises an acid selected from the group consisting of hydrochloric acid, hydrobromic acid, methanesulfonic acid, chloroacetic acid, dichloroacetic acid, trichloroacetic acid, formic acid, acetic acid, and any combination thereof.
4. The method of claim 1, wherein the acid-reactive surface is present in a wellbore penetrating a subterranean formation.

5. The method of claim 4, wherein the acid-reactive surface comprises a matrix comprising the subterranean formation, at least a portion of a particulate pack, or at least a portion of a metal tool that is present in the wellbore.
6. The method of claim 5, wherein the matrix comprises a mineral selected from the group consisting of calcite, dolomite, and any combination thereof.
7. The method of claim 4, wherein the protective coating diverts the mineral acid or the organic acid from a first location in the wellbore where the protective coating is deposited to a second location in the wellbore.
8. The method of claim 1, wherein the protective coating is deposited from a gelled fluid comprising the N-(phosphonoalkyl)iminodiacetic acid or any salt thereof.
9. The method of claim 1, wherein the protective coating is deposited from a fluid phase comprising a suspension of the N-(phosphonoalkyl)iminodiacetic acid or any salt thereof.
10. The method of claim 1, further comprising:
removing the protective coating from the acid-reactive surface by contacting the protective coating with an aqueous fluid having a pH of about 5 or greater.
11. The method of claim 1, wherein the N-(phosphonoalkyl)iminodiacetic acid has a structure of

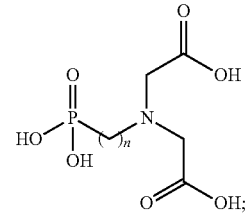

wherein n is an integer ranging between 1 and about 20.
12. The method of claim 11, wherein the N-(phosphonoalkyl)iminodiacetic acid comprises N-(phosphonomethyl)iminodiacetic acid.
13. A method comprising:
introducing a treatment fluid comprising an N-(phosphonoalkyl)iminodiacetic acid or any salt thereof into a wellbore penetrating a subterranean formation;
depositing a protective coating comprising the N-(phosphonoalkyl)iminodiacetic acid or any salt thereof onto an acid-reactive surface in the wellbore;
wherein the acid-reactive surface comprises an acid-reactive substance selected from the group consisting of a metal, a metal salt, a mineral, a carbonate mineral, and an acid-degradable polymer;
contacting a mineral acid or an organic acid with the protective coating without etching substantially reacting the acid-reactive surface where the protective coating is present for a time period when the pH of the mineral acid or organic acid in contact with the protective coating is about 3 or lower; and
diverting the mineral acid or the organic acid from a first location in the wellbore where the protective coating is deposited to a second location in the wellbore.
14. The method of claim 13, further comprising:
reacting the mineral acid or the organic acid with an acid-reactive substance at the second location.
15. The method of claim 13, wherein the acid-reactive surface comprises a matrix comprising the subterranean formation, at least a portion of a particulate pack, or at least a portion of a metal tool that is present in the wellbore.

16. The method of claim 15, wherein the matrix comprises a mineral selected from the group consisting of calcite, dolomite, and any combination thereof.

17. The method of claim 13, wherein the subterranean formation comprises a carbonate mineral.

18. The method of claim 13, wherein the N-(phosphonoalkyl)iminodiacetic acid or any salt thereof is suspended in the treatment fluid.

19. The method of claim 13, wherein the mineral acid or the organic acid comprises an acid selected from the group consisting of hydrochloric acid, hydrobromic acid, methanesulfonic acid, chloroacetic acid, dichloroacetic acid, trichloroacetic acid, formic acid, acetic acid, and any combination thereof.

20. The method of claim 13, further comprising:
removing the protective coating from the acid-reactive surface by contacting the protective coating with an aqueous fluid having a pH of about 5 or greater.

21. The method of claim 13, wherein the mineral acid or the organic acid is introduced into the wellbore after depositing the protective coating.

22. The method of claim 13, wherein a concentration of the N-(phosphonoalkyl)iminodiacetic acid or any salt thereof in the treatment fluid ranges between about 1.5 wt. % and about 15 wt. %.

23. The method of claim 13, wherein the N-(phosphonoalkyl)iminodiacetic acid has a structure of

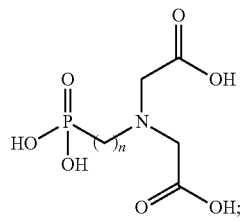

wherein n is an integer ranging between 1 and about 20.

24. The method of claim 23, wherein the N-(phosphonoalkyl)iminodiacetic acid comprises N-(phosphonomethyl)iminodiacetic acid.

* * * * *